(No Model.)
C. T. HANNA.
WHEAT STEAMER AND HEATER.
No. 254,308. Patented Feb. 28, 1882.
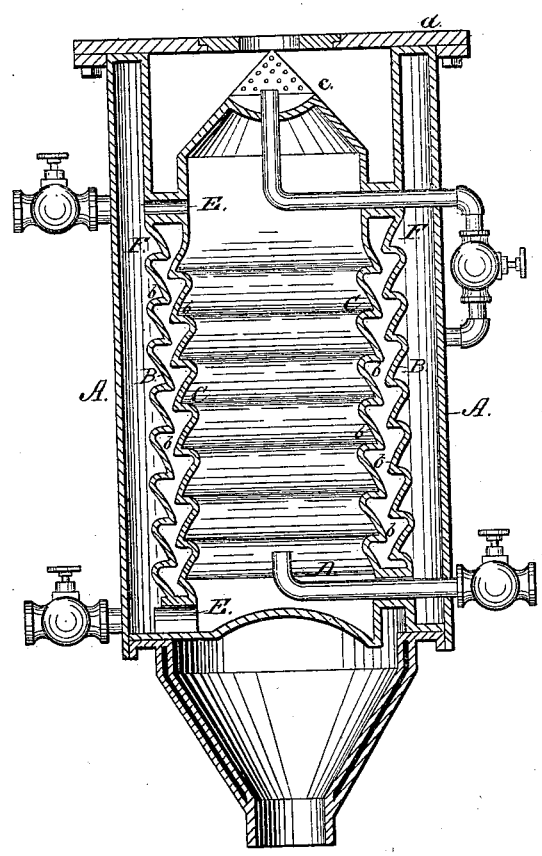
WITNESSES:
W. W. Hollingsworth
Anna W. Hart
INVENTOR:
C. T. Hanna
BY
ATTORNEYS.

United States Patent Office.

CYRUS T. HANNA, OF PITTSBURG, PENNSYLVANIA.

WHEAT STEAMER AND HEATER.

SPECIFICATION forming part of Letters Patent No. 254,308, dated February 28, 1882.

Application filed August 11, 1880. Renewed July 25, 1881. (No model.)

*To all whom it may concern:*

Be it known that I, CYRUS T. HANNA, of Pittsburg, in the county of Allegheny and State of Pennsylvania, have invented a new and useful Improvement in Wheat Steamers and Heaters; and I do hereby declare that the following is a full, clear, and exact description of the same.

In the manufacture of fine grades of flour the great desideratum is to remove the hull of the wheat as completely as possible. In order to do this it has been of late years found most expedient to toughen or lessen the brittleness of the hull or pellicle, so that it may be removed in comparatively large pieces by the tearing action of the grinding-stones. For this purpose resort has been had to the application of heat or heat and moisture, as described in my Patent No. 107,680, granted September 27, 1870.

My present invention relates to an improvement in that class of apparatus for curing grain and preparing it for grinding which are provided with devices by which the grain is deflected alternately in opposite directions in its passage through the same, and thereby more thoroughly and uniformly subjected to the action of moisture and heat, so that the hull may be removed with greater ease and more perfectly than heretofore.

In accompanying drawing I represent a vertical section of my improved apparatus.

A indicates the outer cylinder, and B C the two inside cylinders, of a device or apparatus for steaming and heating wheat for the purpose of toughening and expanding the hull or pellicle preparatory to grinding. The pipe D conducts steam into the center of the inner cylinder, C, from which its passes through tubes E into the annular space F between the cylinders A B, thus insuring an even heat in both the inner and outer cylinders. The grain enters the apparatus from a hopper, (not shown,) and passes through the annular space surrounding the inner cylinder, C. In other words, it passes between two metal surfaces, which are evenly heated. As the inevitable consequence, the grain also becomes heated before reaching the conical discharge end H of the apparatus.

In order to deflect the grain alternately in opposite directions as it descends, and thus cause it to turn several times and become thoroughly and evenly heated, I construct both cylinders B C with circumferential corrugations *b*, whose upper sides are long and inclined while their under sides are short and drop back abruptly, thereby forming a series of narrow inclined planes alternating in position, so that the wheat will slide from one onto the other, then back or in the opposite direction onto the next below, and so on in regular succession as it descends through the apparatus. The wheat-kernels being moistened in the first instance by steam emitted from the perforated cone *c*, the pellicle or hull is toughened, and the heat subsequently applied serves to dry out the surplus moisture, leaving the hull expanded and in condition to admit of its easy removal by the grinding-stones.

In putting the apparatus in place it is secured between the stones and stock-bin by means of bolts (not shown) passing through the upper flange, *d*, and the lower end is connected with the hopper of the stones by means of a spout. (Not shown.)

I do not claim broadly an apparatus of this class provided with alternating series of circular inclined planes; but What I do claim is—

The improved grain-heating apparatus having its inner cylinders constructed with circumferential corrugations *b*, which are formed integrally with them and arranged as shown, thus alternating in position, as and for the purpose described.

CYRUS T. HANNA.

Witnesses:
  JOS. A. KELLY,
  FRANK WILCOX,
  H. T. MORRIS.